3,763,157
RECOVERY AND RECIRCULATION OF CHLORINE IN CYANURIC CHLORIDE PRODUCTION

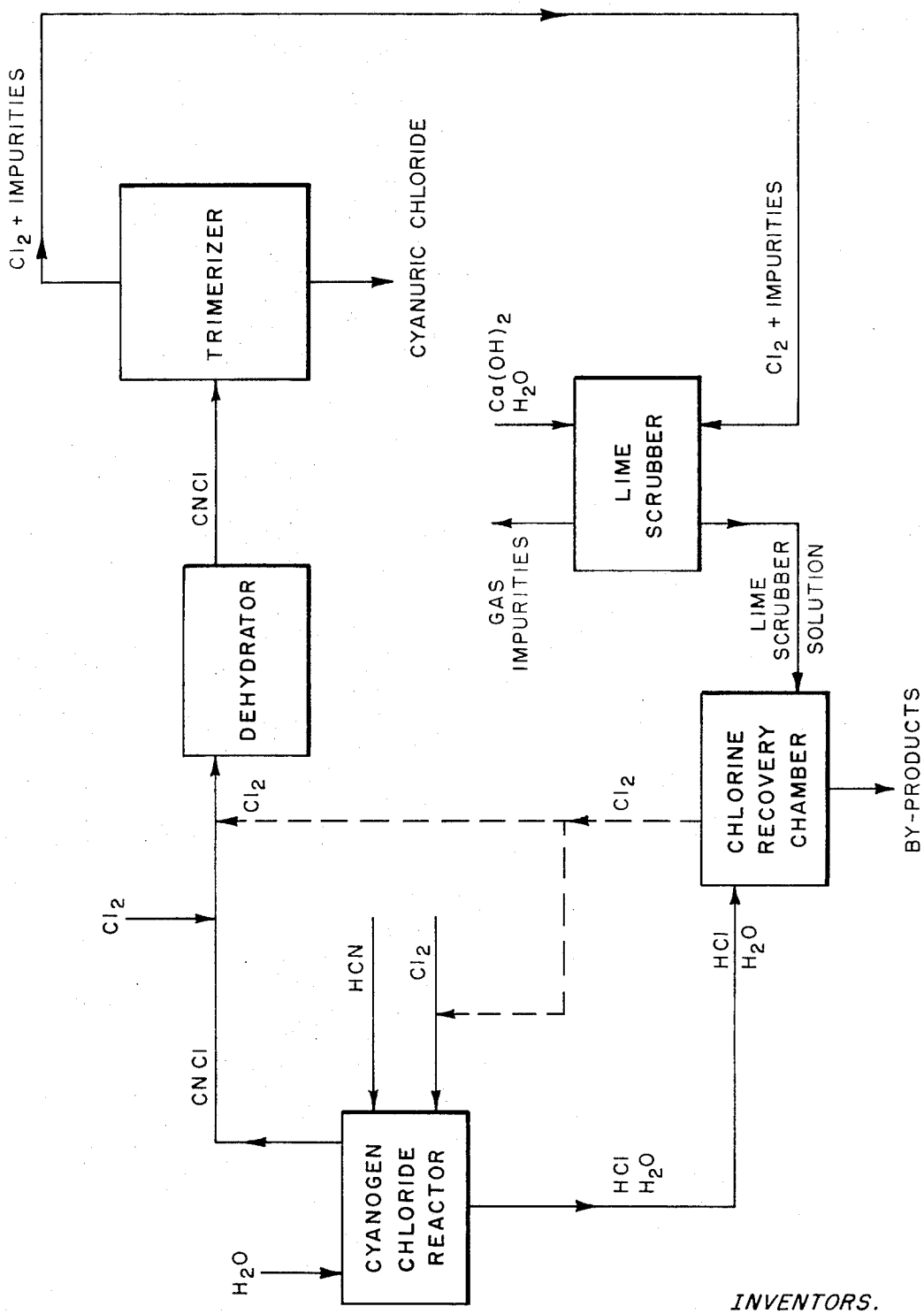

Yelagondahally S. Suryanarayana, Mobile, and William M. Britton, Millry, Ala., assignors to Ciba-Geigy Corporation, Ardsley, N.Y.
Filed June 18, 1971, Ser. No. 154,454
Int. Cl. C01b *21/00;* C07c *119/00*
U.S. Cl. 260—248 C
3 Claims

ABSTRACT OF THE DISCLOSURE

Excess chlorine employed in the trimerization of cyanogen chloride to produce cyanuric chloride is reacted with calcium hydroxide or sodium hydroxide and water. The resulting material is further reacted with acid to generate free chlorine of sufficient purity to be used as an inlet material. Preferably the acid is hydrogen chloride which is a by-product employed in making cyanogen chloride from hydrocyanic acid, chlorine and water.

BACKGROUND OF THE INVENTION

The present invention is directed to a process for recycling and re-using excess chlorine employed in the production of cyanuric chloride. This invention also is directed to utilizing hydrogen chloride in the recovery of chlorine wherein the employed hydrogen chloride is a by-product acid.

The production of cyanuric chloride in the prior art may utilize inlet hydrocyanic acid, chlorine and water to initially manufacture cyanogen chloride. The cyanuric chloride is produced by the trimerization of the gaseous cyanogen chloride with an excess of chlorine in the presence of an activated carbon catalyst at an elevated temperature in excess of about 250° C.

The prior art also discloses a refinement of the two step procedure bypassing a separate reactor for cyanogen chloride production. This embodiment employs the reactant materials of cyanogen and chlorine at temperatures in excess of 350° C. in the presence of activated charcoal. The technique is exemplified in U.S. Pat. 3,312,697.

Cyanuric chloride is a chemical intermediate in the production of numerous products such as chemotherapeutic agents, herbicides, dyes, brightening agents, synthetic resins, plastics, rubber, explosives and other materials.

SUMMARY OF THE INVENTION

This invention represents an improvement in the production of cyanuric chloride by a two step technique, namely producing cyanogen chloride from inlet hydrocyanic acid, chlorine and water with later trimerization of the cyanogen chloride into the desired end compound.

The improvement in the trimerization to produce cyanuric chloride is the recovery of excess chlorine in effluent gas which is reacted with calcium hydroxide and water to form calcium hypochlorite and calcium chloride. Subsequently, by-product hydrogen chloride produced from the formation of cyanogen chloride is reacted with the calcium hypochlorite to produce free chlorine. This gas is at sufficient purity to allow recycling as an inlet component. The use of this chlorine may take place at two separate places. The regenerated chlorine may be a portion of the reactant chlorine gas with hydrocyanic acid or cyanogen to produce the necessary cyanogen chloride intermediate. Alternatively, the regenerated chlorine may be introduced with the produced cyanogen chloride into the trimerizer since an excess of chlorine must be present to allow the cyanuric chloride formation.

DESCRIPTION OF THE FIGURE

The attached figure represents a schematic flow sheet of the present process wherein in a cyanogen chloride reactor, hydrocyanic acid and chlorine are reacted in the presence of water to form cyanogen chloride with hydrogen chloride produced as a by-product material. The cyanogen chloride with entrapped water vapor is passed to a dehydrator. This cyanogen chloride with water removed is fed to a trimerizer wherein in the presence of excess chlorine and a catalyst, the formation of cyanuric chloride takes place. Excess gaseous chlorine and gaseous impurities are passed to a lime scrubber wherein slaked lime and water react to form calcium hypochlorite and calcium chloride. Untreated gaseous material is vented from the lime scrubber. The lime scrubber solution is introduced to a chlorine recovery chamber with a separate hydrogen chloride and water inlet from the cyanogen chloride reactor. The resulting reaction generates free chlorine which is either recycled into the cyanogen chloride reactor or introduced as necessary excess chlorine into the trimerizer.

DETAILED DESCRIPTION OF THE INVENTION

Initially, in the technique of this disclosure in making cyanuric chloride, source materials are first employed to make cyanogen chloride. The cyanogen chloride then is trimerized at elevated temperature in the presence of a catalyst to produce the desired compound.

In the formation of cyanogen chloride, hydrocyanic acid, chlorine and water are essential source materials for the production of the intermediate cyanogen chloride. The reaction taking place is well known in the art, namely

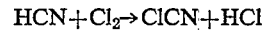

$$HCN + Cl_2 \rightarrow ClCN + HCl$$

The cyanogen chloride is produced by feeding separately a chlorine gas stream and hydrocyanic acid into a reaction chamber with the hydrocyanic acid inlet desirably above the chlorine inlet.

Water is added at the top of the reactor to aid in removing by-product hydrogen chloride from the bottom of the reactor. The amount of inlet water will control the concentration of the by-product HCl withdrawn from the reactant chamber bottom. The gaseous cyanogen chloride as well as chlorine desirably utilized in excess are removed in the overhead stream in the reactant chamber. However, it is possible to employ stoichiometric quantities of hydrocyanic and chlorine to produce the cyanogen chloride so essentially no chlorine is present in the cyanogen chloride overhead gas removed from the reactant chamber. This technique of producing cyanogen chloride is found in U.S. patent application Ser. No. 65,457 filed Aug. 20, 1970.

Alternatively, the technique and apparatus in producing the cyanogen chloride from source inlets of hydrocyanic acid, chlorine and water may be in accordance with the technique set forth in U.S. Pat. 3,197,273, which disclosure is in corporated by reference herein.

The cyanogen chloride is desirably fed to dehydrators since the product gas stream contains water vapor. The removal of water vapor is essential for optimum efficiency since otherwise poisoning of the activated carbon catalyst will take place in the trimerizer.

This invention uses the prior art technique in forming cyanuric chloride by heating cyanogen chloride in a trimerizer.

An activated carbon catalyst is employed wherein an elevated temperature in excess of about 250° C. aids in the following reaction:

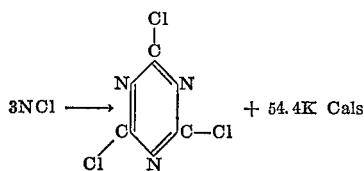

The carbon catalyst is known in the art and may be of the type disclosed in U.S. Pat. 3,018,288.

To conduct the cyanuric chloride trimerization, it has been necessary to employ an excess level of chlorine of at least 3 mole percent and, more desirable, 5 to 6%. Chlorine concentrations in the gas of about 10 to 15% may be used. The excess chlorine aids in preventing rapid deactivation of the activated carbon trimerization catalyst.

However, after the reaction is completed, an excess of chlorine remains and it is ordinarily lost in the effluent. While the chlorine is treated to prevent contamination of the atmosphere, nevertheless economic disadvantages are realized from the loss of the excess chlorine.

In the process of this disclosure, the excess chlorine effluent is treated in a lime scrubber wherein chlorine reacts with the calcium hydroxide and water in accordance with the following reaction:

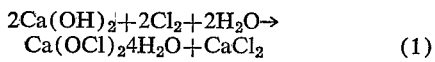

The calcium hydroxide with water are employed in excess to insure reaction of essentially all chlorine. Impurities initially present in the chlorine gas stream are vented from the chamber since they do not react as the chlorine gas does.

The calcium hypochlorite formed in the reaction of the chlorine, water and calcium hydroxide will serve as a source for chlorine gas which may be recycled as an inlet chlorine source. It is highly desirable that formation of free chlorine gas be produced by reaction of calcium hypochlorite with byproduct hydrogen chloride formed in the formation of cyanogen chloride.

The hydrogen chloride by-product material will be in the desired concentration by control of the amount of inlet water into the cyanogen chloride inlet chamber. Generally, the hydrogen chloride concentration may be from 2 to 15% by weight and, more desirably, 3 to 5%. While other sources acids will react with the calcium hypochlorite to form the chlorine gas, economic disadvantages result. Therefore, it is highly desirable that the by-product hydrogen chloride be reacted with the calcium hypochlorite.

The HCl desirably is fed into the top of a packed column provided with a reboiler at the bottom. The lime scrubber solution containing the reactant products of the chlorine, water and lime enters below the inlet HCl. The mixed solution of the lime scrubber and acid enters the reboiler whereupon the mixture is heated to boiling temperature.

With feed rates near stoichiometric, the release of chlorine by the reaction of HCl and calcium hypochlorite is rapid and essentially complete. The chlorine recovery chamber is operated under slightly acid conditions to insure essentially complete calcium hypochlorite decomposition and to neutralize the free lime. Additionally, it has been found that excess lime scrubber effluent solution tends to result in a type of solids formation that may tend to plug effluent exit lines and slow the release of chlorine.

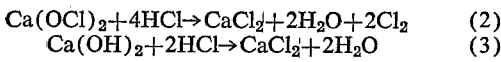

The free chlorine from the reaction is recovered except for a slight amount dissolved in the effluent.

The above reactions of (1) and (2) serve to illustrate that the amount of chlorine recovered for re-cycling on the basis of the trimerizer effluent will be 100%. Testing has shown practical efficiencies of 99+% are possible. While calcium chloride is generated as a by-product material, nevertheless the calculated efficiency is considered to be 100% since by-product hydrogen chloride from the cyanogen chloride reactor serves a chlorine source. Since this by-product material is normally lost, the recovery percentage of chlorine by the disclosed technique is considered to result in an efficient process.

The recovered chlorine may be recycled as an inlet stream at several different sections in the reaction procedure. The recovered chlorine may be introduced in the initial reaction stage to produce cyanogen chloride utilizing inlet hydrogen cyanide, chlorine and water. Alternatively, the recovered chlorine may be recycled as an inlet stream in addition to the cyanogen chloride in the reaction to produce the desired cyanuric chloride.

To further illustrate the innovative aspects of the present invention, the following example is provided:

EXAMPLE I

The technique set forth in U.S. Pat. 3,197,273 to produce cyanogen chloride from hydrocyanuric acid, water and chlorine was employed wherein the by-product hydrogen chloride concentration in water was 5.0% by weight.

The cyanuric chloride, after passing through a dehydrator, was employed with excess chlorine in a trimerizer to produce the desired cyanogen chloride in accordance with U.S. Pat. 2,491,459, with the exception that an acid washed charcoal catalyst (CAXC) was employed. The chlorine effluent from the trimerizer was at a concentration of 6% by weight.

In the laboratory the chlorine was reacted with calcium hydroxide and water and the resultant lime scrubber effluent was reacted with the by-product hydrogen chloride at the 5.0% concentration as produced by the cyanogen chloride reactor. The acid was fed into the top of a packed column provided with a reboiler at the bottom. The HCl solution passed through approximately four feet of the packing before coming into contact with the lime scrubber solution. Lime scrubber solution entered the column at a point six inches from the bottom of the packed section of the column. The mixed solution of the lime scrubber and acid entered the reboiler where it was heated to boiling temperature. Free chlorine gas was vented from the top of the chamber and collected. A chorine material balance based upon the chlorine gas from the trimerizer (neglecting HCl from the cyanogen chloride reactor) disclosed that a 99.87% chlorine recovery was obtained based on the weight of the trimerizer chlorine effluent.

Although the present disclosure has been specific to hydrocyanic acid as a source material, the use of the art recognized equivalent of cyanogen is likewise within the scope of the present invention in the production of cyanogen chloride. The by-product hydrogen chloride produced in the reaction is utilized in the same manner as the hydrogen chloride produced with hydrocyanic acid as a source material.

In a similar fashion, calcium hydroxide has been named as a base in the reaction to produce the hypochlorite from which chlorine is regenerated. However, sodium hydroxide may be employed instead of the calcium hydroxide to produce the recycle of chlorine gas of the required purity.

Therefore, many widely different embodiments of this invention may be made without departing from the spirit thereof and accordingly the appended claims are intended to be definitive of the present disclosure.

What is claimed is:

1. In a process for preparing cyanuric chloride comprising the steps of:
   (a) reacting hydrocyanic acid with chlorine in the presence of water to produce cyanogen chloride and by-product HCl;
   (b) separating cyanogen chloride and by-product HCl;
   (c) removing water vapor from the cyanogen chloride;
   (d) trimerizing cyanogen chloride to cyanuric chloride in the presence of chlorine;
   (e) Separating the chlorine from the cyanuric chloride; the improvement comprising:
   (f) reacting the chlorine with calcium hydroxide or sodium hydroxide and water to produce calcium hydrochlorite or sodium hypochlorite;
   (g) reacting the hypochlorite of step (f) and by-product hydrogen chloride from step (b) to produce free chlorine;
   (h) recycling the chlorine from step (g) to step (a) or (d).

2. The process of claim 1 wherein said chlorine from step (g) is recycled as an inlet to step (a).

3. The process of claim 1 wherein said chlorine from step (g) is recycled as an inlet to step (d).

References Cited

UNITED STATES PATENTS

| | | | |
|---|---|---|---|
| 3,197,273 | 7/1965 | Trickey | 23—359 |
| 3,539,565 | 11/1970 | Evers et al. | 260—248 C |
| 2,398,891 | 4/1946 | Julien et al. | 23—219 |
| 3,592,616 | 7/1971 | Durrell et al. | 23—359 |

MILTON WEISSMAN, Primary Examiner

U.S. Cl. X.R.

423—371